US011741344B2

(12) United States Patent
Kursun et al.

(10) Patent No.: US 11,741,344 B2
(45) Date of Patent: Aug. 29, 2023

(54) CUSTOM CONVOLUTIONAL NEURAL NETWORK ARCHITECTURES FOR EXPOSURE DETECTION

(71) Applicant: Bank of America Corporation, Charlotte, NC (US)

(72) Inventors: Eren Kursun, New York City, NY (US); Hongda Shen, Metuchen, NJ (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 871 days.

(21) Appl. No.: 16/707,916

(22) Filed: Dec. 9, 2019

(65) Prior Publication Data

US 2021/0174167 A1 Jun. 10, 2021

(51) Int. Cl.
*G06N 3/08* (2023.01)
*G06N 3/045* (2023.01)
*G10L 15/16* (2006.01)

(52) U.S. Cl.
CPC ............... *G06N 3/045* (2023.01); *G06N 3/08* (2013.01); *G10L 15/16* (2013.01)

(58) Field of Classification Search
CPC . G06N 3/082; G06N 3/08; G06N 3/04; G10L 15/16
See application file for complete search history.

(56) References Cited

U.S. PATENT DOCUMENTS 11,055,608 B2 * 7/2021 Bichler .................. G06N 3/049
2003/0200189 A1 * 10/2003 Meng ..................... G06N 3/082
706/26
2014/0257803 A1 * 9/2014 Yu ........................... G10L 15/07
704/232

OTHER PUBLICATIONS

Miller, et al., "Designing Neural Networks Using Genetic Algorithms," ICGA'89—see previous Office action attachment. (Year: 1989).*

Khalil, et al., "An Efficient Approach for Neural Network Architecture," IEEE 2018—see previous Office action attachment. (Year: 2018).*

Klein, et al., "A Dynamic Convolutional Layer for Short Range Weather Prediction," CVPR 2015—see previous Office action attachment. (Year: 2015).*

Miller, et al., "Designing Neural Networks Using Genetic Algorithms," ICGA'89. (Year: 1989).*

Khalil, et al., "An Efficient Approach for Neural Network Architecture," IEEE2018. (Year: 2018).*

Klein, et al., "A Dynamic Convolutional Layer for Short Range Weather Prediction," CVPR 2015. (Year: 2015).*

* cited by examiner

*Primary Examiner* — Feng-Tzer Tzeng
(74) *Attorney, Agent, or Firm* — Moore & Van Allen PLLC; Nicholas C. Russell

(57) ABSTRACT

A system is typically configured for customizing interconnectivity of one or more layers associated with a neural network architecture, wherein the neural network architecture is associated with an application, customizing functional transformation of the one or more layers associated with the neural network architecture, wherein each of the one or more layers comprises a custom transformation function, and generating a custom neural network architecture based on customizing the interconnectivity and the functional transformation of the one or more layers.

20 Claims, 4 Drawing Sheets

200

CUSTOMIZE INTERCONNECTIVITY OF ONE OR MORE LAYERS ASSOCIATED WITH A NEURAL NETWORK ARCHITECTURE, WHEREIN THE NEURAL NETWORK ARCHITECTURE IS ASSOCIATED WITH AN APPLICATION
210

CUSTOMIZE FUNCTIONAL TRANSFORMATION OF THE ONE OR MORE LAYERS ASSOCIATED WITH THE NEURAL NETWORK ARCHITECTURE, WHEREIN EACH OF THE ONE OR MORE LAYERS COMPRISES A CUSTOM TRANSFORMATION FUNCTION
220

GENERATE A CUSTOM NEURAL NETWORK ARCHITECTURE BASED ON CUSTOMIZING THE INTERCONNECTIVITY AND THE FUNCTIONAL TRANSFORMATION OF THE ONE OR MORE LAYERS
230

OPTIMIZE THE CUSTOM NEURAL NETWORK ARCHITECTURE BASED ON ONE OR MORE METRICS
240

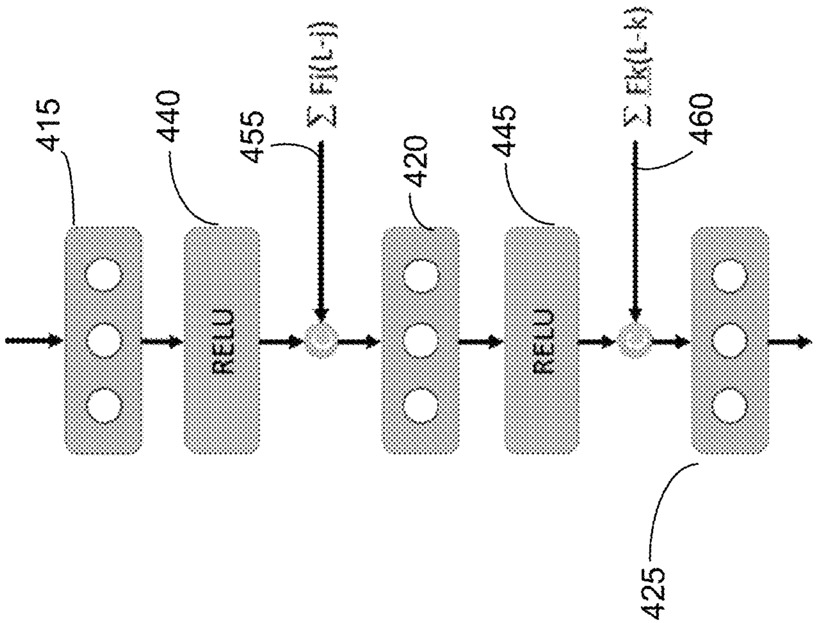
Additive Connector
Concatenate Connector
*FIG. 4*
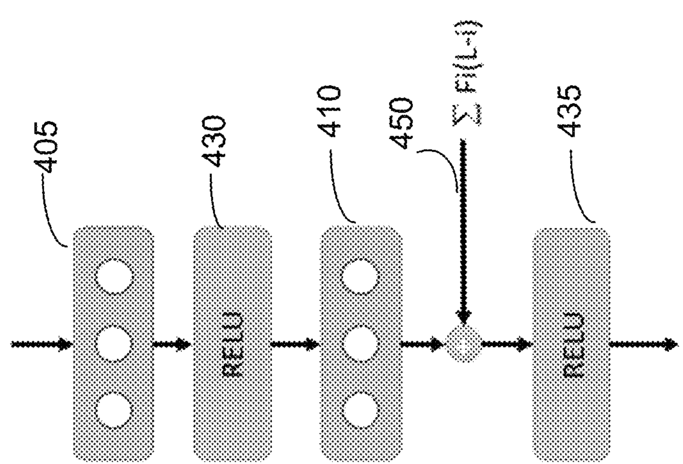

CUSTOM CONVOLUTIONAL NEURAL NETWORK ARCHITECTURES FOR EXPOSURE DETECTION

BACKGROUND

Artificial Neural Networks have a wide range of application areas. There exists a need for a system to customize architectures for different applications.

BRIEF SUMMARY

Embodiments of the present invention address the above needs and/or achieve other advantages by providing apparatuses (e.g., a system, computer program product and/or other devices) and methods for generating custom neural network architectures. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

For sample, illustrative purposes, system environments will be summarized. The system customizes interconnectivity of one or more layers associated with a neural network architecture, wherein the neural network architecture is associated with an application, customizes functional transformation of the one or more layers associated with the neural network architecture, wherein each of the one or more layers comprises a custom transformation function, and generates a custom neural network architecture based on customizing the interconnectivity and the functional transformation of the one or more layers.

In some embodiments, customizing the functional transformation of the one or more layers comprises dynamically altering the custom transformation function associated with each of the one or more layers, wherein the custom transformation function associated with each of the one or more layers is a function of time.

In some embodiments, customization of the interconnectivity and the functional transformation of the one or more layers is based on data associated with the application and a type of the application.

In some embodiments, the neural network architecture is a convolutional neural network architecture.

In some embodiments, the neural network architecture is a non-convolutional neural network architecture.

In some embodiments, the present invention optimizes the custom neural network architecture based on one or more metrics and an optimization algorithm.

In some embodiments, optimizing the custom neural network comprises performing incremental updates on the custom neural network architecture.

In some embodiments, the optimization algorithm is an online optimization algorithm.

In some embodiments, the optimization algorithm is an offline optimization algorithm.

In some embodiments, the application is an exposure detection application.

In some embodiments, the application is an image processing application.

In some embodiments, the application is a speech recognition application.

In some embodiments, the present invention to connects one or more neural networks.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
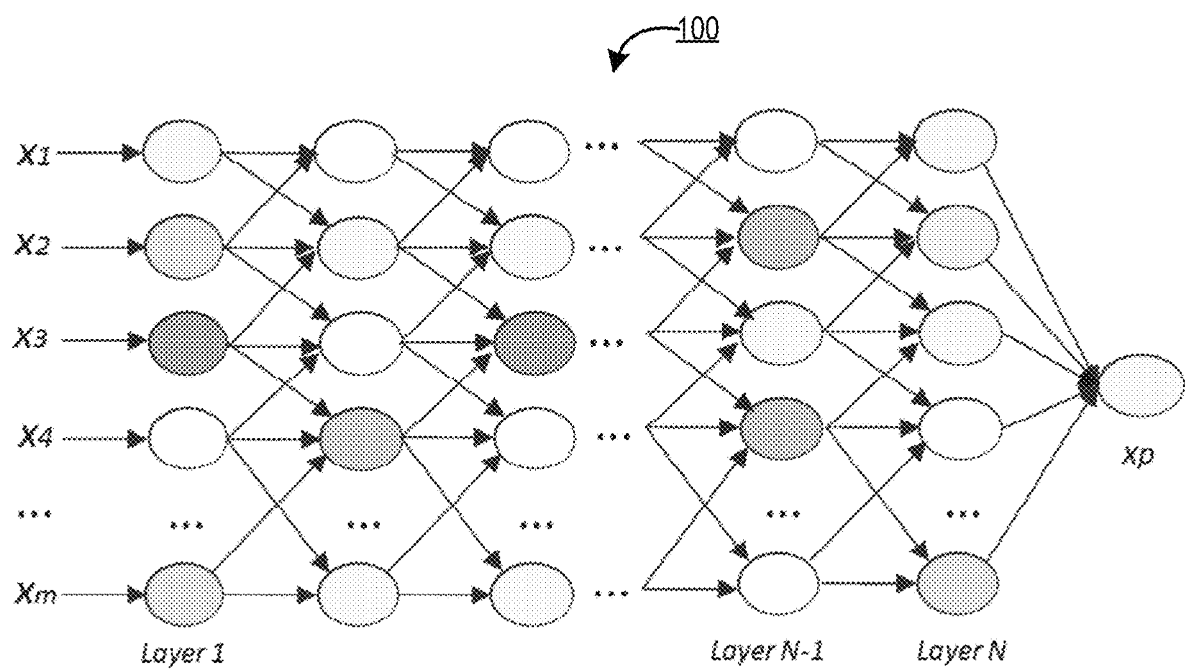
Figure 2:
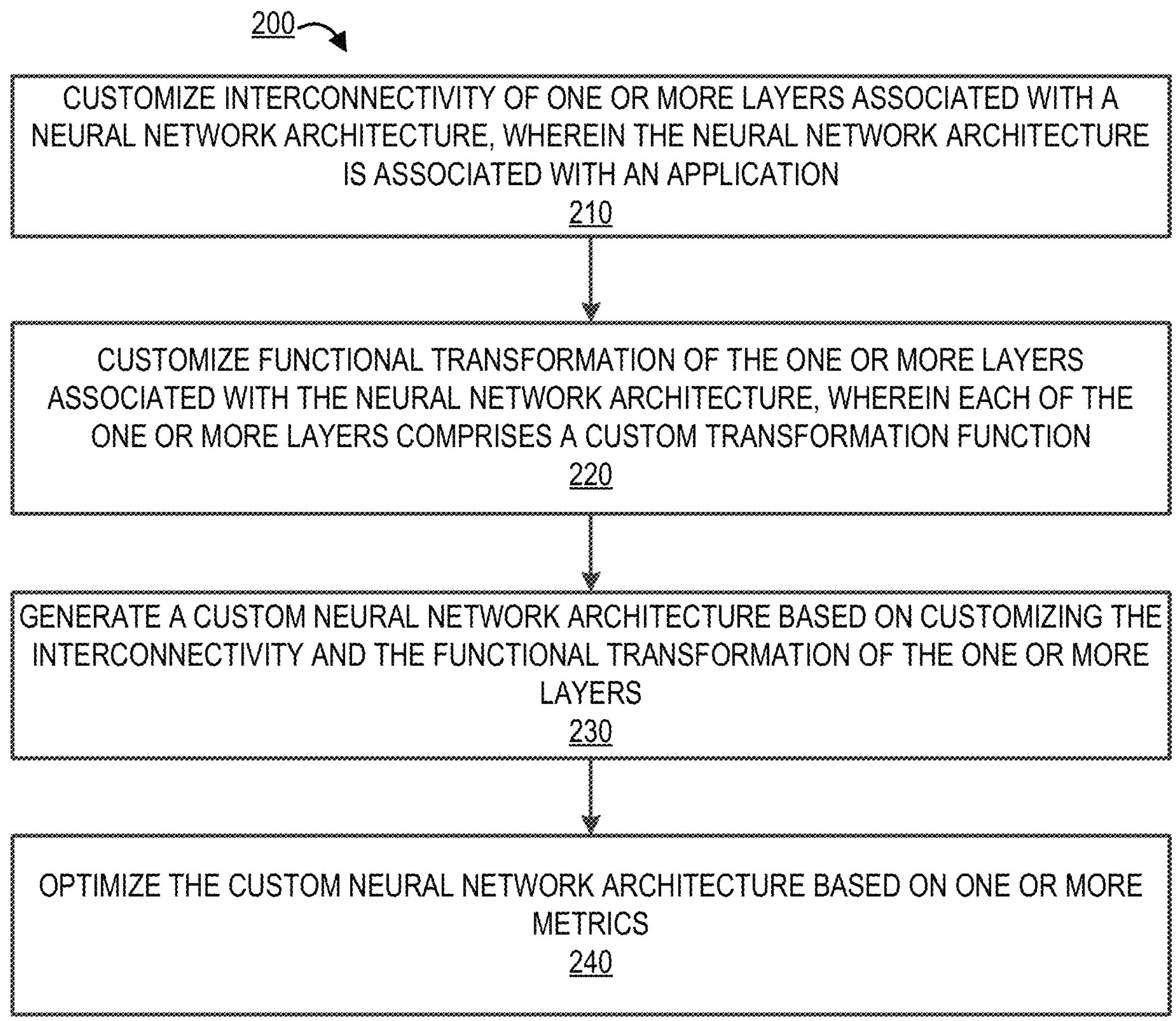
Figure 3:
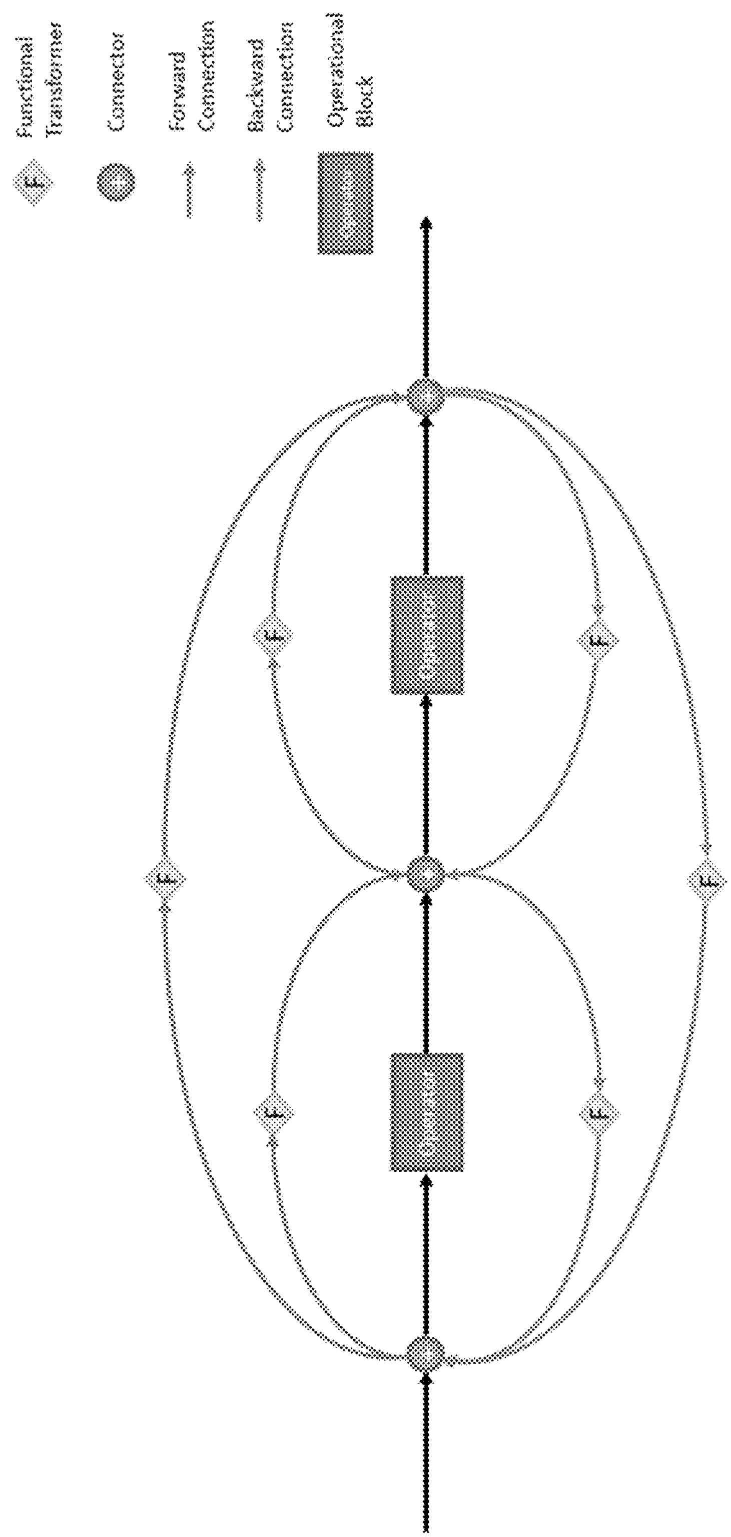

Having thus described embodiments of the invention in general terms, reference will now be made the accompanying drawings, wherein:

FIG. 1 provides a block diagram illustrating a system environment for generating custom neural network architectures for different applications, in accordance with an embodiment of the invention;

FIG. 2 provides a flowchart illustrating a process flow for generating custom neural network architectures for different applications, in accordance with an embodiment of the invention;

FIG. 3 provides a solution architecture employed by the architecture customization system, in accordance with an embodiment of the invention; and FIG. 4 provides a solution architecture employed by the architecture customization system, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

In accordance with embodiments of the invention, the terms "entity" or "resource entity" may include any organization that processes financial transactions including, but not limited to, banks, credit unions, savings and loan associations, investment companies, stock brokerages, insurance companies and the like. Furthermore, embodiments of the present invention use the term "user" or "customer." It will be appreciated by someone with ordinary skill in the art that the user or may be an employee of the financial institution. In some embodiments o the invention, the "entity" may include any non-financial organization that utilizes neural networks.

Artificial Neural Networks (ANNs) have found a wide range of application areas in the last decade ranging from classic image recognition, to speech recognition, cybersecurity and exposure use cases, medicine related applications, and the like. Artificial Neural Networks are initially inspired by the human visual cortex where neurons are connected in a feed forward fashion for different applications (e.g., image processing). However, a large number of variations and customizations have been implemented and shown improvements in different application areas. Among the most popular architectures is CNN (Convolutional Neural Networks) which use transformation functions (convolutions) as well as pooling and other stages to process images effectively.

In recent years ResNets (Residual Networks) have been proposed to feed in the input from earlier layers of the neural network to the layer after to improve the effectiveness of the architecture. Based on the signals and functions from the earlier layers, the classification output has access to lower complexity functions of the initial image. Moreover, this provides better feedback to the edge weights of the earlier layers in the neural network. DenseNet is effective where the connectivity is significantly higher than ResNet and all the layers of the neural network is fed to all the other layers in a fully connected feed forward fashion. Customization is absolutely essential for applications and underlying data and the existing systems do not effectively customize neural network architectures. The system of the invention presents a solution to provide custom architectures for different applications.

FIG. 1 illustrates a block diagram of a neural network, in accordance with an embodiment of the invention. Typically, a neural network comprises one or more layers and the architecture of the neural networks is fixed. As shown, a first layer communicates with the second layer, the second layer with a third layer, and the like. However, there is no communication between the first layer and the third layer. The $n^{th}$ layer typically communicates with just $n+1^{th}$ layer. As such, there is no communication with other non-adjacent layers (e.g., $n+2^{th}$ layer, $n+3^{th}$ layer, and the like).

FIG. 2 provides a flowchart illustrating a process flow for generating custom neural network architectures for different applications, in accordance with an embodiment of the invention. As shown in block 210, the system customizes interconnectivity of one or more layers associated with a neural network architecture, wherein the neural network architecture is associated with an application. As shown in block 220, the system customizes functional transformation of the one or more layers associated with the neural network architecture, wherein each of the one or more layers comprises a custom transformation function. As shown in block 230, the system generates a custom neural network architecture based on customizing the interconnectivity and the functional transformation of the one or more layers. As shown in block 240, the system optimizes the custom neural network architecture based on one or more metrics. The steps of the process flow 200 are explained in greater detail below.

Conventional systems utilize neural network architectures where a layer is connected to its adjacent layer and as such receives an input only from its adjacent layer. However, such connections between layers make the processing of the neural networks inefficient. The system of this invention employs a custom architecture that improves the effectiveness of convolutional feed forward neural networks by customizing the connectivity among the layers. In some embodiments, the system implements the custom architecture on non-convolutional neural networks.

In some embodiments, the system uses a custom connectivity function between layers such that for each layer L, the output of each layer preceding Layer $L-i$ is taken into account by applying a functional transformation of Fi. The custom connectivity function associated with such an operation is represented by the equation $L=\Sigma Fi(L-i)$. FIG. 3 provides a solution architecture employed by the architecture customization system, in accordance with an embodiment of the invention. FIG. 3 illustrates connections between multiple layers and each layer has forward connections and backward connections with every other layer. FIG. 4 provides a solution architecture employed by the architecture customization system, in accordance with an embodiment of the invention. As shown, one or more layers 405, 410, 415, 420, and 425 are connected with each other with transformers 430, 435, 440, and 445 in between each of the layers. Additionally, feedback is received from other layers as shown in 450, 455, and 460. The transformers 430, 435, 440, and 445 transform the feedback signals and the forward signals between the two adjacent layers and transfer the transformed signals to the next layer.

In some other embodiments, the feed forward network feedback is relaxed where the feedback layers are also taken into consideration, such that each Proceeding Layer $L+j$ is taken into the transformation. The custom connectivity function associated with such an operation is represented by the equation $L=\Sigma Fi(L-i)+Fj(L+j)$.

In some embodiments, the system uses the proposed architecture for skip-level feedback such that each Layer L receives Functional transformation signal from earlier $L-2$ layer.

In some embodiments, the system uses custom transformation functions in the processing of each layer such that later layers have more weightage than earlier layers in the transformation function.

In some embodiments, the system changes the custom functions and architecture with in-field training and retraining the models, thereby providing dynamic optimization capabilities to the underlying architecture. In some embodiments, the solution provided by the system of the present invention may be used as a Neural Network architecture for exposure detection. Depending on the complexity of the underlying exposure patterns, the system customizes the architecture over time.

The system provides a means to achieve such customizations to prevent overfitting with one-time training (e.g. gradient descent algorithm). In another embodiment, the system incrementally forms the resulting neural network architecture over time with minor edits to the (i) connectivity and (ii) functional transformation of the skip level connections.

The system performs transformations to the original architecture through the proposed function are application and especially data specific. For example, in the exposure detection application, the resulting architecture may be a SpiderNet, as it customizes the architecture to the target (in this case exposure) cases.

In one embodiment, the architecture may be implemented in a physical device, where the layer outputs and functional transformation functions can be Multiplexed (MUX)ed into the later layers. In one embodiment, the architecture may be implemented in a multi-layer silicon chip with flexible interconnections to enable the functional transformations and dynamic connectivity between the layers of the neural network.

In another embodiment, the functional transformation function F(i) is time dependent and changes based on the streaming data. In this case, the function and the connectivity change dynamically over time.

In some embodiments, the system also optimizes the process to determine the best architecture for the given historical and current streaming data. In some embodiments, the system determines incrementally the best architecture for the given historical and current streaming data.

In some data sets, heavy interconnectivity among layers in a dense neural network gives faster convergence and improved performance. However, in other cases, the same architecture causes overfitting, even though the application is the same. This process is dependent on the underlying data patterns and requires optimization. The system optimizes the architecture for different data sets and prevents overfitting.

The system optimizes the architectures based on one or more metrics. The one or more metrics may include but are not limited to (i) Prediction accuracy and Mean Square Error (MSE) or other metrics of the result and (ii) Overfitting metrics (e.g. performance drop between the holdout and out of range data) to balance out the architectural parameters.

In some embodiments, the system uses a Genetic algorithm (similarly Simulated Annealing can be used) to start with an initial set of parameters and tries to find the best solution using the custom metric functions proposed. In some embodiments, the system may utilize simulated annealing algorithm instead of genetic algorithm. In some embodiments, the optimization algorithm may not be a one-time process and may require dynamic changes to the underlying architecture with streaming data. In some embodiments, the system performs offline optimization. In some embodiments, the system performs online optimization. In some embodiments, the system also connects one or more neural networks in an ensemble way.

In some embodiments, a system environment comprising a system of the present invention may exist for implementing the present invention. In some embodiments, the environment comprises an architecture customization system, an entity system, computing device system, and one or more resource entity systems. One or more users may be included in the system environment, where the users interact with the other entities of the system environment via a user interface of the computing device system. In some embodiments, the one or more user(s) of the system environment may be employees of an entity associated with the entity system. In some embodiments, the one or more users may be customers of the entity.

The entity system(s) may be any system owned or otherwise controlled by an entity to support or perform one or more process steps described herein. In some embodiments, the managing entity is a financial institution. In some embodiments, the managing entity is a non-financial institution.

The architecture customization system is a system of the present invention for performing one or more process steps described herein. In some embodiments, the architecture customization system may be an independent system. In some embodiments, the architecture customization system may be a part of the entity system.

The architecture customization system, the entity system, the computing device system, and/or the resource entity systems may be in network communication across the system environment through the network. The network may include a local area network (LAN), a wide area network (WAN), and/or a global area network (GAN). The network may provide for wireline, wireless, or a combination of wireline and wireless communication between devices in the network. In one embodiment, the network includes the Internet. In general, the architecture customization system is configured to communicate information or instructions with the entity system, the computing device system, and/or the resource entity systems across the network.

The computing device system may be a computing device of the user. In general, the computing device system communicates with the user via a user interface of the computing device system, and in turn is configured to communicate information or instructions with the architecture customization system, entity system, and/or the resource entity systems across the network.

In one embodiment of the invention, the entity system includes one or more processing devices operatively coupled to a network communication interface and a memory device. In certain embodiments, the entity system is operated by a first entity, such as a financial institution, while in other embodiments, the entity system is operated by an entity other than a financial institution.

It should be understood that the memory device may include one or more databases or other data structures/repositories. The memory device also includes computer-executable program code that instructs the processing device to operate the network communication interface to perform certain communication functions of the entity system described herein. For example, in one embodiment of the entity system, the memory device includes, but is not limited to, a network server application, an architecture customization application, one or more entity applications authentication application, and a data repository comprises user data and exposure data. The computer-executable program code of the network server application, the architecture customization application, the one or more entity applications, and the authentication application to perform certain logic, data-extraction, and data-storing functions of the entity system described herein, as well as communication functions of the entity system.

The network server application, the architecture customization application, the one or more entity applications, and the authentication application are configured to store data in the data repository or to use the data stored in the data repository when communicating through the network communication interface with the architecture customization system, the computing device system, and/or the resource entity systems to perform one or more process steps described herein. In some embodiments, the entity system may receive instructions from the architecture customization system via the architecture customization application to perform certain operations. The architecture customization application may be provided by the architecture customization system. The one or more entity applications may be any of the applications used, created, modified, and/or managed by the entity system. In some embodiments, the entity applications may include image processing application, speech recognition application, or the like that utilize neural networks. The authentication application may be used to authenticate one or more users to access the one or more entity applications. In one embodiment, the entity application may be an online banking application provided by the entity system.

In one embodiment of the invention, the architecture customization system includes one or more processing devices operatively coupled to a network communication interface and a memory device. In certain embodiments, the architecture customization system is operated by a first entity, such as a financial institution, while in other embodiments, the architecture customization system is operated by an entity other than a financial institution. In some embodiments, the architecture customization system is owned or operated by the entity of the entity system. In some embodiments, the architecture customization system may be an independent system. In alternate embodiments, the architecture customization system may be a part of the entity system.

It should be understood that the memory device may include one or more databases or other data structures/repositories. The memory device also includes computer-executable program code that instructs the processing device to operate the network communication interface to perform certain communication functions of the architecture customization system described herein. For example, in one embodiment of the architecture customization system, the memory device includes, but is not limited to, a network provisioning application, an architecture customization application, an optimization application, and a data repository comprising data processed or accessed by one or more applications in the memory device. The computer-executable program code of the network provisioning application, the architecture customization application, and the optimization application may instruct the processing device to perform certain logic, data-processing, and data-storing functions of the architecture customization system described herein, as well as communication functions of the architecture customization system.

The network provisioning application, the architecture customization application, and the optimization application are configured to invoke or use the data in the data repository when communicating through the network communication interface with the entity system, the computing device system, and/or the resource entity systems. In some embodiments, the network provisioning application, the architecture customization application, and the optimization application may store the data extracted or received from the entity system, the resource entity system, and the computing device system in the data repository. In some embodiments, the network provisioning application, the architecture customization application, and the optimization application may be a part of a single application. One or more processes performed by the network provisioning application, the architecture customization application, and the optimization application are described in detail below.

Some embodiments of the computing device system include a processor communicably coupled to such devices as a memory, user output devices, user input devices, a network interface, a power source, a clock or other timer, a camera, and a positioning system device. The processor, and other processors described herein, generally include circuitry for implementing communication and/or logic functions of the computing device system. For example, the processor may include a digital signal processor device, a microprocessor device, and various analog to digital converters, digital to analog converters, and/or other support circuits. Control and signal processing functions of the computing device system are allocated between these devices according to their respective capabilities. The processor thus may also include the functionality to encode and interleave messages and data prior to modulation and transmission. The processor can additionally include an internal data modem. Further, the processor may include functionality to operate one or more software programs, which may be stored in the memory. For example, the processor may be capable of operating a connectivity program, such as a web browser application. The web browser application may then allow the computing device system to transmit and receive web content, such as, for example, location-based content and/or other web page content, according to a Wireless Application Protocol (WAP), Hypertext Transfer Protocol (HTTP), and/or the like.

The processor is configured to use the network interface to communicate with one or more other devices on the network. In this regard, the network interface includes an antenna operatively coupled to a transmitter and a receiver (together a "transceiver"). The processor is configured to provide signals to and receive signals from the transmitter and receiver, respectively. The signals may include signaling information in accordance with the air interface standard of the applicable cellular system of the wireless network. In this regard, the computing device system may be configured to operate with one or more air interface standards, communication protocols, modulation types, and access types.

As described above, the computing device system has a user interface that is, like other user interfaces described herein, made up of user output devices and/or user input devices. The user output devices include a display (e.g., a liquid crystal display or the like) and a speaker or other audio device, which are operatively coupled to the processor.

The user input devices, which allow the computing device system to receive data from a user such as the user may include any of a number of devices allowing the computing device system to receive data from the user, such as a keypad, keyboard, touch-screen, touchpad, microphone, mouse, joystick, other pointer device, button, soft key, and/or other input device(s). The user interface may also include a camera, such as a digital camera.

The computing device system may also include a positioning system device that is configured to be used by a positioning system to determine a location of the computing device system. For example, the positioning system device may include a GPS transceiver. In some embodiments, the positioning system device is at least partially made up of the antenna, transmitter, and receiver described above. For example, in one embodiment, triangulation of cellular signals may be used to identify the approximate or exact geographical location of the computing device system. In other embodiments, the positioning system device includes a proximity sensor or transmitter, such as an RFID tag, that can sense or be sensed by devices known to be located proximate a merchant or other location to determine that the computing device system is located proximate these known devices.

The computing device system further includes a power source, such as a battery, for powering various circuits and other devices that are used to operate the computing device system. Embodiments of the computing device system may also include a clock or other timer configured to determine and, in some cases, communicate actual or relative time to the processor or one or more other devices.

The computing device system also includes a memory operatively coupled to the processor. As used herein, memory includes any computer readable medium (as defined herein below) configured to store data, code, or other information. The memory may include volatile memory, such as volatile Random Access Memory (RAM) including a cache area for the temporary storage of data. The memory may also include non-volatile memory, which can be embedded and/or may be removable. The non-volatile memory can additionally or alternatively include an electrically erasable programmable read-only memory (EEPROM), flash memory or the like.

The memory can store any of a number of applications which comprise computer-executable instructions/code executed by the processor to implement the functions of the computing device system and/or one or more of the process/method steps described herein. For example, the memory may include such applications as a conventional web browser application, an architecture customization application, an entity application, or the like. These applications also typically instructions to a graphical user interface (GUI) on the display that allows the user to interact with the entity system, the architecture customization system, and/or other devices or systems. The memory of the computing device system may comprise a Short Message Service (SMS) application configured to send, receive, and store data, information, communications, alerts, and the like via the wireless telephone network. In some embodiments, the one or more users may interact with the entity system, via the computing device system and the entity application, to utilize the one or more entity applications provided by the entity. In such embodiments, the one or more users may interact with the architecture customization system, via the computing device system and the architecture customization application, to utilize the functions provided by the systems and to enhance the one or more entity applications provided by the entity.

The memory can also store any of a number of pieces of information, and data, used by the computing device system and the applications and devices that make up the computing device system or are in communication with the computing device system to implement the functions of the computing device system and/or the other systems described herein.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for generating custom neural network architectures, comprising:
- a multi-layer device comprising one or more neural networks comprising one or more layers, wherein the system is configured to alter the one or more neural networks by:
  - customizing functional transformation of the one or more layers associated with a neural network architecture, wherein each of the one or more layers comprises a custom transformation function;
  - customizing interconnectivity of one or more layers associated with the neural network architecture, wherein the neural network architecture is associated with an application,
  - wherein the interconnectivity of one or more layers associated with the neural network architecture is customized via determining a custom connectivity function for a first layer of the one or more layers, and
  - wherein the custom connectivity function is based on the custom functional transformation of one or more preceding layers of the one or more layers that precede the first layer in the sequence;
  - dynamically altering the custom transformation function associated with each of the one or more layers, wherein the custom transformation function associated with each of the one or more layers is a function of time; and
  - generating a custom neural network architecture based on customizing the interconnectivity and the functional transformation of the one or more layers.

2. The system of claim 1, wherein customization of the interconnectivity and the functional transformation of the one or more layers is based on data associated with the application and a type of the application.

3. The system of claim 1, wherein the neural network architecture is a convolutional neural network architecture.

4. The system of claim 1, wherein the neural network architecture is a non-convolutional neural network architecture.

5. The system of claim 1, wherein the system is further configured to optimize the custom neural network architecture based on one or more metrics and an optimization algorithm, wherein the one or more metrics comprise prediction accuracy, Mean Square Error (MSE), and overfitting metrics to balance out architectural parameters.

6. The system of claim 5, wherein optimizing the custom neural network comprises performing incremental updates on the custom neural network architecture.

7. The system of claim 1, wherein the multi-layer device is a multi-layer silicon chip, wherein the multi-layer silicon chip comprises flexible interconnections to enable the functional transformations between layers of the custom neural network.

8. A computer program product for generating custom neural network architectures, the computer program product comprising instructions for:
- customizing functional transformation of the one or more layers associated with a neural network architecture, wherein each of the one or more layers comprises a custom transformation function;
- customizing interconnectivity of one or more layers associated with the neural network architecture, wherein the neural network architecture is associated with an application,
- wherein the interconnectivity of one or more layers associated with the neural network architecture is customized via determining a custom connectivity function for a first layer of the one or more layers, and
- wherein the custom connectivity function is based on the custom functional transformation of one or more preceding layers of the one or more layers that precede the first layer in the sequence;
- dynamically altering the custom transformation function associated with each of the one or more layers, wherein the custom transformation function associated with each of the one or more layers is a function of time; and
- generating a custom neural network architecture based on customizing the interconnectivity and the functional transformation of the one or more layers.

9. The computer program product of claim 8, wherein customization of the interconnectivity and the functional transformation of the one or more layers is based on data associated with the application and a type of the application.

10. The computer program product of claim 8, wherein the computer-executable instructions are further configured for optimizing the custom neural network architecture is based on one or more metrics and an optimization algorithm, wherein the one or more metrics comprise prediction accuracy, Mean Square Error (MSE), and overfitting metrics to balance out architectural parameters.

11. The computer program product of claim 8, wherein the neural network architecture is a non-convolutional neural network architecture.

12. The computer program product of claim 8, wherein the neural network architecture is a convolutional neural network architecture.

13. The computer program product of claim 8, wherein the customizing the interconnectivity of the one or more layers allows neurons in a first layer of the one or more layers to communicate with all the one or more layers.

14. A computer implemented method for generating custom neural network architectures, wherein the method comprises:

customizing functional transformation of the one or more layers associated with a neural network architecture, wherein each of the one or more layers comprises a custom transformation function;

customizing interconnectivity of one or more layers associated with the neural network architecture, wherein the neural network architecture is associated with an application, wherein the interconnectivity of one or more layers associated with the neural network architecture is customized via determining a custom connectivity function for a first layer of the one or more layers, and wherein the custom connectivity function is based on the custom functional transformation of one or more preceding layers of the one or more layers that precede the first layer in the sequence;

dynamically altering the custom transformation function associated with each of the one or more layers, wherein the custom transformation function associated with each of the one or more layers is a function of time; and generating a custom neural network architecture based on customizing the interconnectivity and the functional transformation of the one or more layers.

15. The computer implemented method of claim 14, wherein customization of the interconnectivity and the functional transformation of the one or more layers is based on data associated with the application and a type of the application.

16. The computer implemented method of claim 14, wherein optimizing the custom neural network architecture is based on one or more metrics and an optimization algorithm, wherein the one or more metrics comprise prediction accuracy, Mean Square Error (MSE), and overfitting metrics to balance out architectural parameters.

17. The computer implemented method of claim 14, wherein the neural network architecture is a convolutional neural network architecture.

18. The computer implemented method of claim 14, wherein the neural network architecture is a non-convolutional neural network architecture.

19. The computer implemented method of claim 14, wherein the customizing the interconnectivity of the one or more layers allows neurons in a first layer of the one or more layers to communicate with all the one or more layers.

20. The system of claim 1, wherein the customized neural network is updated over time based on one or more detected exposure cases, wherein the customized neural network is configured to detect exposure to potential attacks.

* * * * *